No. 812,340. PATENTED FEB. 13, 1906.
H. M. HARDGROVE.
SEPARATOR.
APPLICATION FILED APR. 3, 1905.

2 SHEETS—SHEET 1.

Fig. 1.

WITNESSES:

INVENTOR
Henry M. Hardgrove
BY
ATTORNEYS.

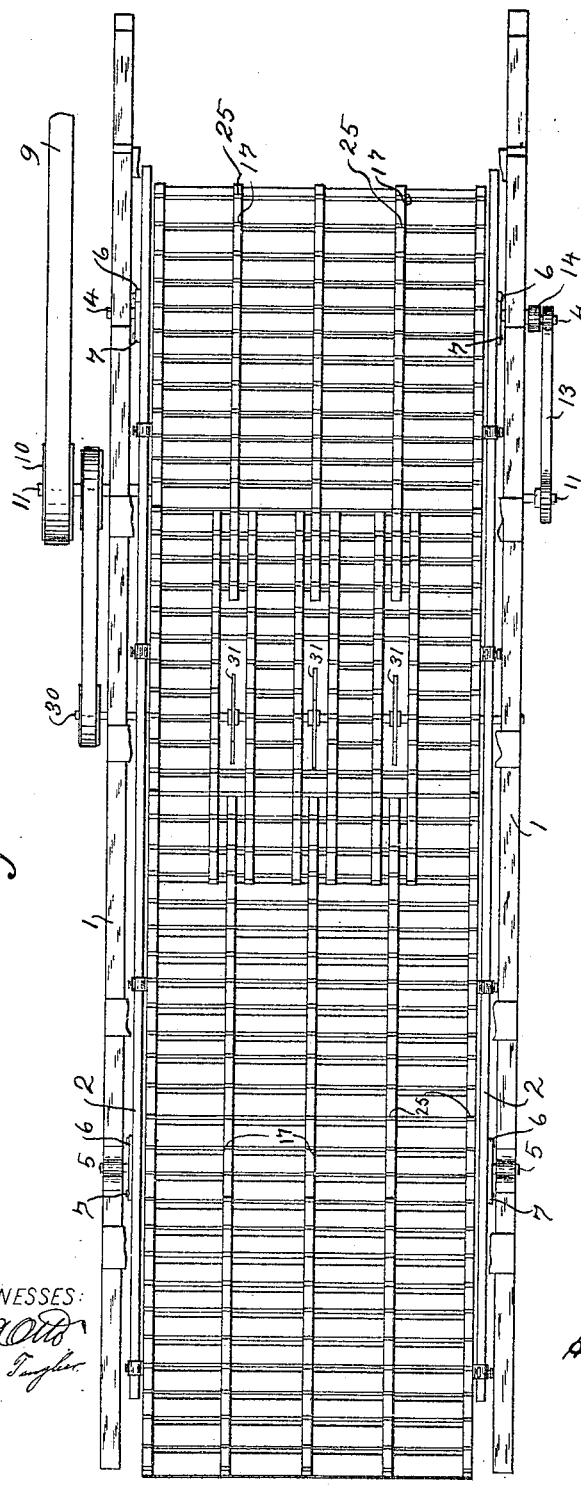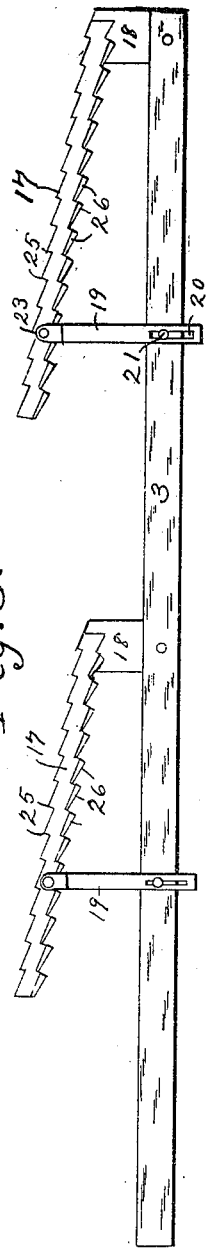

UNITED STATES PATENT OFFICE.

HENRY M. HARDGROVE, OF MADISON, WISCONSIN.

SEPARATOR.

No. 812,340. Specification of Letters Patent. Patented Feb. 13, 1906.

Application filed April 3, 1905. Serial No. 253,566.

*To all whom it may concern:*

Be it known that I, HENRY M. HARDGROVE, a citizen of the United States, residing at Madison, county of Dane, and State of Wisconsin, have invented new and useful Improvements in Separators, of which the following is a specification.

My invention relates to improvements in separators for threshing-machines, and pertains especially to that class of separators in which the straw is advanced after the threshing operation by a series of reciprocating toothed bars connected with oppositely-vibrating and substantially parallel frames.

The object of my invention is to provide means, first, for economizing space in the construction of the separator by bringing the frames into close proximity to each other; second, to provide means for adjusting the shaking-bars at various angles in accordance with the character of the material, and, third, to provide a form of beater which will not clog in the straw, but which will act coöperatively with the shaking-bars in separating the grain.

In the following description reference is had to the accompanying drawings, in which—

Figure 1 is a side view of my invention with portions of the frames broken away. Fig. 2 is a plan view and Fig. 3 is a side view, of one of the frames.

Like parts are identified by the same reference characters throughout the several views.

1 is the stationary frame of the separator. 2 and 3 are movable or vibratory frames, which are supported from the main frame 1 by means of cross-shafts 4 and 5, respectively, which are each provided with arms 6 and 7, pivotally connected with the respective frames 2 and 3. A vibratory motion is communicated to the frames from any suitable source of power by means of a belt 9, pulley 10, shaft 11, eccentric 12, eccentric-arm 13, and a crank 14, connected with the shaft 4, the connection being made in such a manner that the crank 14 will be oscillated and the frames alternately lifted upwardly and rearwardly, one frame being depressed while the other frame is being lifted and the two frames being brought into close proximity, if not actual contact, at the limit of the stroke in one direction.

Each of the frames is provided with a series of bars 17, which project upwardly and rearwardly from a cross-bar 18 and are supported from the frame near their rear ends by links 19, slotted at 20 and adjustably connected with the corresponding frame at 21 by means of a bolt passing through said slot. A cross-rod 23, extending through apertures in the bars 17, is preferably used to connect the links 19 with the bars. The upper surfaces of the bars are preferably notched to form a series of teeth 25. The lower surfaces are similarly notched and provided with a series of cross-slats 26. The notches are so formed that the adjacent edges of the cross-slats will be somewhat separated vertically to permit the grain to pass between them. The upper rear ends of the bars 17 are without cross-slats and arranged to project over the lower front ends of similar bars in the other vibratory frame, whereby the straw in passing from one set of bars to the next is deposited beyond the ends of the bars in the succeeding set.

The bars 17 of one set are preferably arranged in pairs, as shown in the central portion of Fig. 2, and a cross-shaft 30, extending underneath the central portions of these bars, is provided with a series of rectangular plates 31, each of which projects upwardly in one of the spaces between the bars composing one of said pairs of bars, the cross-slats 26 being cut away to provide space for the plates to operate. These plates 31 are of such dimensions that the corners will be exposed successively above the bars when the plates are rotated, and they will project for a greater distance above the bars when the frame from which these bars are supported is depressed, for the shaft 30 is mounted in suitable bearings on the stationary frame. The shaft 30 is located sufficiently below the pairs of bars 17 so that only the corner portions of the plate 31 will project above the bars, except when said bars are depressed to their fullest extent. Owing to the rectangular shape of the plates, the descending rear edges will leave the straw in a direction substantially at right angles to the upper surface of the bars and will therefore have no tendency to catch in the straw and draw it between the bars.

In the construction shown the shaft 30 is located above the upper vibratory frame, and the bars which are arranged in pairs are mounted upon said upper frame. With this arrangement the shaft 30 will not interfere with the vibrations of the frames.

Having thus described my invention, what I claim as new, and desire to secure by Letters Patent, is—

1. In a separator of the described class, the combination of a vibratory frame; straw-supporting devices mounted on said frame; and a set of beaters arranged to project upwardly between the straw-supporting devices; each of said beaters consisting of a rotary straight-sided rectangular plate, arranged in such relation to the frame that its corners will project above the straw-supporting devices successively as the plate is rotated; said plates being exposed above such devices at varying distances during the vibration of the frame.

2. In a separator of the described class, the combination of a set of superposed vibratory frames; supporting cross-shafts mounted on stationary bearings between said frames, and provided with arms connected with each of the frames; means for vibrating said frames into and out of proximity with each other; a series of inclined straw-supporting toothed bars mounted on each of said frames, with the bars of one frame having raised rear end portions projecting a substantial distance over the lower front end portions of the bars on the other frame, in all positions of frame adjustment.

3. In a separator of the described class, the combination of a vibratory frame; toothed straw-supporting bars arranged in sets on said frame; and a set of beaters arranged to project upwardly between the toothed bars of one of the sets of bars; each of said beaters consisting of a rotary straight-sided rectangular plate, arranged in such relation to the bars that its corners will project above the bars successively as the plate is rotated; said plates being exposed above the bars at varying distances during the vibration of the frame.

4. In a separator of the described class, the combination of a set of vibratory frames; toothed straw-supporting bars arranged in sets on each of said frames; and a set of beaters arranged to project upwardly between the toothed bars of one of the sets of bars; each of said beaters consisting of a rotary straight-sided rectangular plate arranged in such relation to the bars that its corners will project above the bars successively as the plate is rotated, and at varying distances dependent upon the position of the bars; the bars between which said beaters extend being arranged in pairs, one on each side of each beater and in comparatively close proximity thereto.

In testimony whereof I affix my signature in the presence of two witnesses.

HENRY M. HARDGROVE.

Witnesses:
LEVERETT C. WHEELER,
JAS. B. ERWIN.